April 9, 1946.　　　　R. B. HUNTER　　　　2,398,007
ELECTRIC CIRCUIT CONTROLLER
Filed June 19, 1944　　　　4 Sheets-Sheet 1
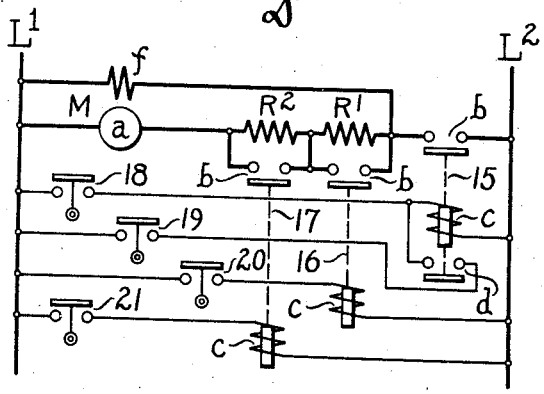
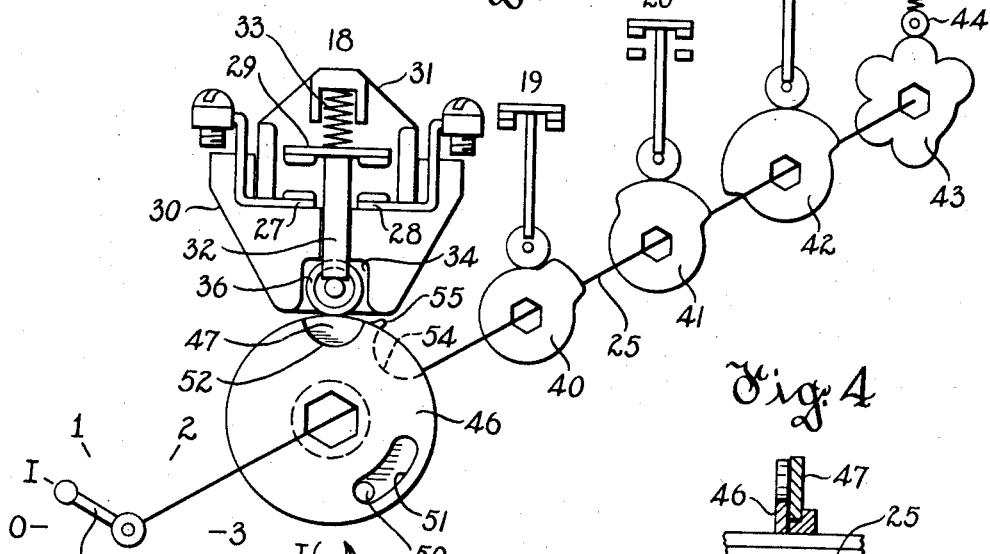
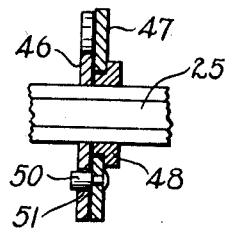
Inventor
Richard B. Hunter
By ~~Franklin Hubbard~~
Attorney

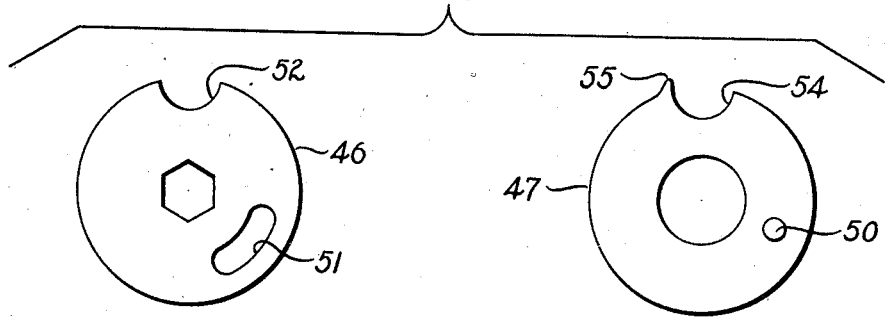
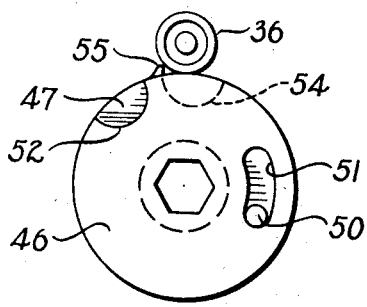
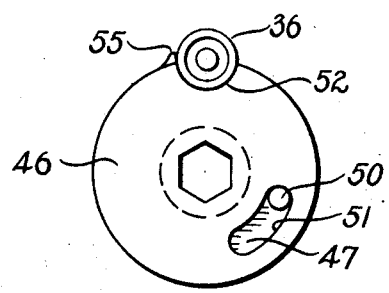
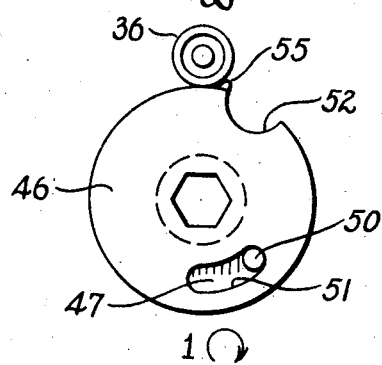

April 9, 1946.   R. B. HUNTER   2,398,007
ELECTRIC CIRCUIT CONTROLLER
Filed June 19, 1944   4 Sheets-Sheet 3
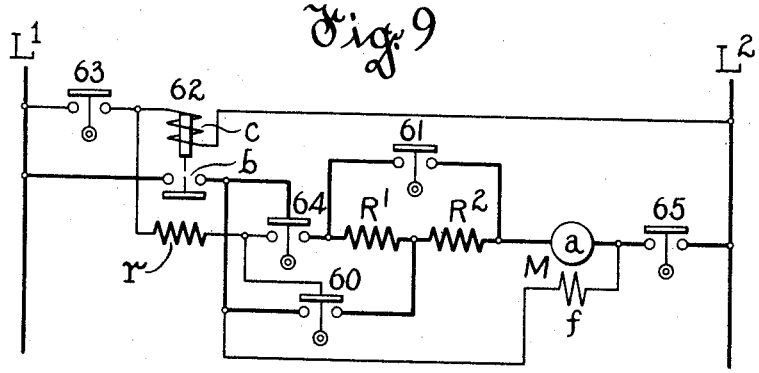
*Fig. 9*
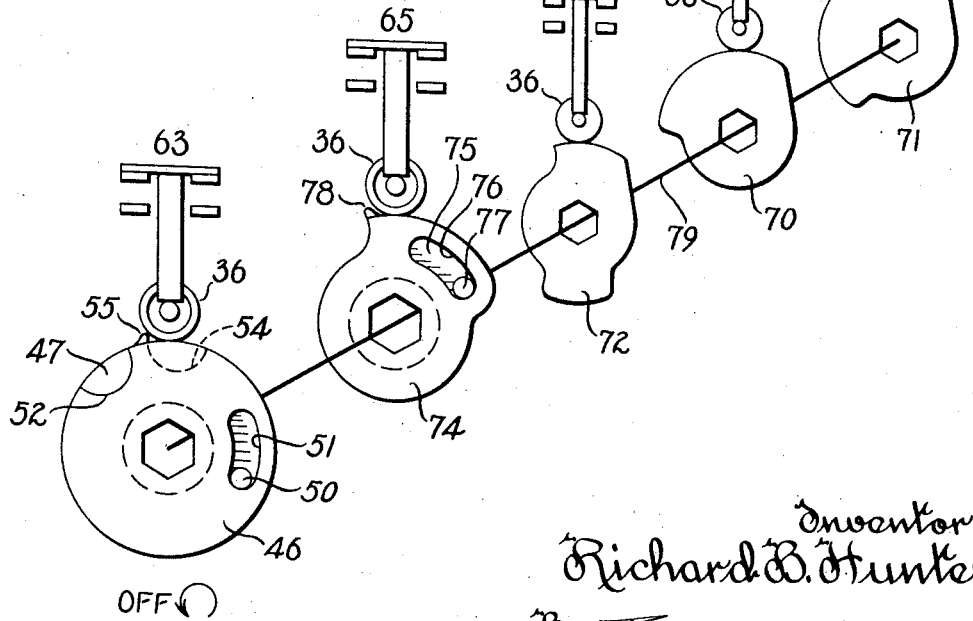
*Fig. 10*
*Fig. 11*
Inventor
Richard B. Hunter
By
Attorney

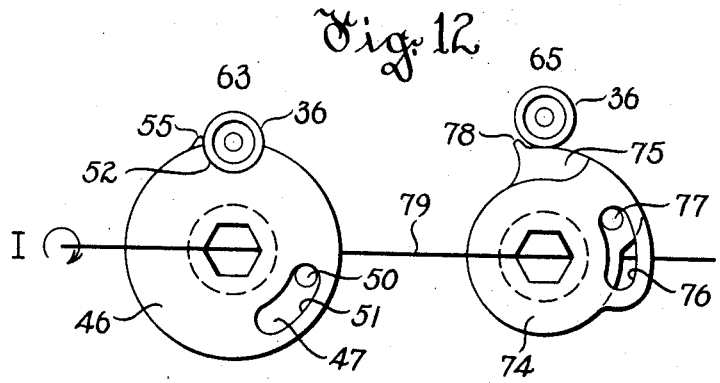
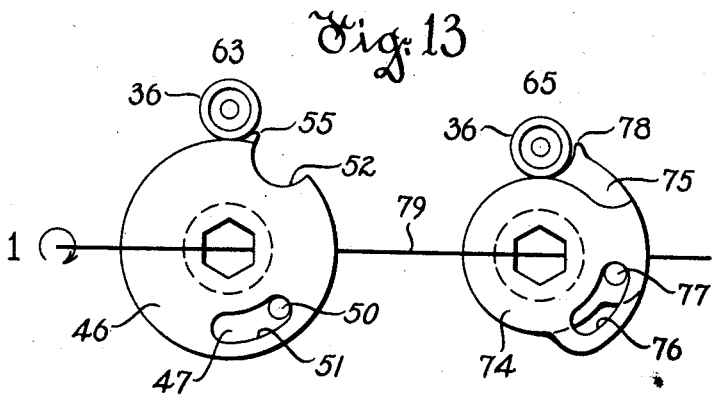
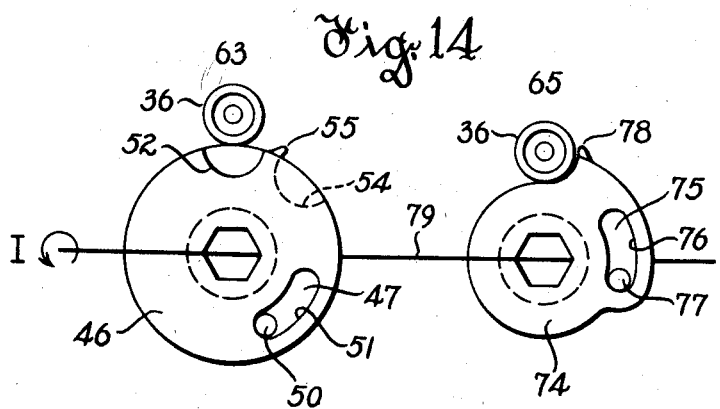

Patented Apr. 9, 1946

2,398,007

UNITED STATES PATENT OFFICE 2,398,007

ELECTRIC CIRCUIT CONTROLLER

Richard B. Hunter, Shorewood, Wis., assignor to Cutler-Hammer, Inc., Milwaukee, Wis., a corporation of Delaware Application June 19, 1944, Serial No. 540,976

16 Claims. (Cl. 175—375)

This invention relates to electric circuit controllers especially advantageous for control of electric motors but not limited thereto.

More particularly the invention relates to controllers comprising means responsive to abnormal electrical conditions in the controlled circuit to effect interruption of said circuit and to such controllers where it is desired to insure return to "off" or some other definite position as an incident to reclosure of the controlled circuit.

An object of the invention is to provide an improved controller of the aforestated character which will accomplish mechanical functions enabling simplification of the electrical means heretofore required to effect the desired protection.

Another object is to provide such a controller especially advantageous where low voltage protection is desired and advantageous also where the controlled circuit is to be commutated directly by manual means or indirectly through electromagnetic switches under the control of the manual means.

Another object is to provide such a controller which may be constructed in various different ways to afford motor acceleration or speed regulation or both in any of numerous different ways.

Another object is to provide a controller accomplishing the desired results by manipulation in a customary manner thus to avoid need of familiarity with the novel construction.

Another object is to provide a controller of the aforementioned character comprising an improved control unit of the cam-operated type wherein certain of the cams are so formed and utilized as to make possible simplification of the required electrical means.

Other objects and advantages of the invention will hereinafter appear.

Certain embodiments of the invention are illustrated in the accompanying drawings and the same will now be described, it being understood that the embodiments illustrated are susceptible of various modifications without departing from the scope of the appended claims.

In the drawings:

Figure 1 shows one form of motor control wherein the motor circuits are controlled indirectly by the switches of a mechanical unit through the medium of electromagnetic switches;

Fig. 2 is a chart showing the sequence control of the switches of Fig. 1;

Fig. 3 is a schematic showing of a cam type unit comprising the mechanical switches of Fig. 1;

Fig. 4 is a detailed showing of the relation of certain of the cams of Fig. 3;

Fig. 5 shows separated a pair of coacting cams of Fig. 3;

Figs. 6, 7 and 8 show the aforementioned coacting cams in different relations;

Fig. 9 shows diagrammatically a different species of motor control wherein the mechanical switches have direct control of the motor circuits;

Fig. 10 is a chart showing the sequence control of the switches of Fig. 9;

Fig. 11 is a schematic showing of a cam type unit comprising the mechanical switches of Fig. 10, and Figs. 12, 13 and 14 show coacting cams of Fig. 11 in different relations.

Referring to Fig. 1, there is illustrated a direct current motor M having an armature $a$ and a shunt field $f$, said motor to be connected to lines $L^1$, $L^2$ by an electroresponsive main switch 15 and to be accelerated through the medium of resistors $R^1$ and $R^2$ under the control of electromagnetic switches 16 and 17, respectively. Such resistors are normally in series with the motor armature, being adapted to be progressively short-circuited by the electroresponsive switches 16 and 17. Each of the switches 15, 16 and 17 has normally disengaged contacts $b$ for control of the motor connections and an operating winding $c$ which when energized effects engagement of its contacts $b$. The switches 15 as shown also has normally disengaged auxiliary contacts $d$ to be engaged upon response of said switch.

The main switch 15 has its winding $c$ under the control of mechanically operated switches 18 and 19 and its own auxiliary contacts $d$ for utilization of said switch as a low voltage protective relay in addition to its use as the main switch of the motor circuit. As shown in the diagram, both switches 18 and 19 are open for deenergization of switch 15, whereas as will be apparent from the diagram closure of switch 18 alone will connect the winding $c$ of switch 15 directly across lines $L^1$ and $L^2$ for energization of said winding and response of switch 15 to complete the motor circuit. As will later appear, switch 18 is controlled for closure in a so-called intermediate position of an operating handle, which position is intermediate "off" position and a first operative position of said handle. Also in such intermediate position of the handle the switch 19 is closed and immediately upon response of switch 15 its contacts $d$ together with the switch 19 parallel the mechanical switch 18 to establish a maintaining circuit for winding $c$ of switch 15. Thus without affecting the switch 15 the mechanical switch 18 may be and is re-opened when the handle is moved to its first operative position, whereas switch 19 remains closed until the handle is returned to "off" position. Hence the switch 15 when energized remains energized subject to deenergization at will by switch 19, whereas upon failure of voltage switch 15 of course opens and interrupts its maintaining circuit through disengagement of its own contacts $d$ in consequence of which reenergization of switch 15 becomes dependent upon reclosure of switch 18. On the other hand, switch 18, as will later appear, recloses only after return of the aforementioned handle to "off" position and subsequent movement of the handle to the aforementioned intermediate position, and hence the main switch following a failure of voltage is again rendered responsive only when the mechanical switch operating handle is moved in motor starting direction.

The operating windings $c$ of switches 16 and 17 are under the control of mechanically operated switches 20 and 21, respectively, which switches are also under the control of the aforementioned handle and correlated to the switches 18 and 19 for the sequence control shown by the chart, Fig. 2.

Referring to the chart, Fig. 2, the same indicates by crosses the positions of a 5-position handle in which the mechanically operated switches 18, 19, 20 and 21 are closed, such switches being open in all other positions of the handle, the positions including an "off" position designated O, an intermediate position designated I, and three operating positions designated as 1, 2 and 3. In "off" position all of the switches 18 to 21 are open, whereas when the handle is moved to intermediate position the switches 18 and 19 are closed to energize and maintain energized the motor main switch 15, the switch 18 opening as the handle enters position 1. Thus in position 1 the main switch 15 is closed to complete the motor circuit inclusive of the armature resistances $R^1$ and $R^2$. In the second position the switch 19 remains closed and switch 20 closes to energize switch 16 to short-circuit armature resistance $R^1$, whereas in the third position switches 19 and 20 remain closed and switch 21 closes to energize switch 17, thereby short-circuiting armature resistance $R^2$, the motor then being connected directly across lines $L^1$, $L^2$. On return of the handle to "off" position the switches 21, 20 and 19 open progressively, the switch 19 remaining closed until the handle reaches "off" position. On the other hand, the switch 18, as hereinbefore indicated, is not affected by the return movement of the handle to "off" position but remains open until the handle after return to "off" position is again moved to intermediate position.

Such control of the switches 18 to 21 is afforded by the mechanical means now to be described. Referring to Fig. 3, the same shows the switches 18 to 21 arranged to be operated through the medium of cams by rotation of shaft 25 by a handle 26. All of said switches neglecting their operating cams may be of like form, a desirable form being that shown schematically in greater detail for switch 18. Switch 18 is shown as comprising stationary contacts 27 and 28 and a bridging contact element 29, these contacts being carried by a two-part insulating block 30—31. The block part 30 is recessed at its upper end to receive and to seat the stationary contacts 27 and 28 and also the block part 31 which is suitably secured to block part 30. The bridging contact element 29 is located within the block part 31 in the path of a plunger 32 reciprocably mounted in the base part 30 and said base part 31 has seated therein a coil spring 33 bearing upon said bridging contact element to bias the same toward the stationary contacts 27 and 28. The lower end of the plunger 32 extends into a recess 34 in the block part 30 and bears upon the spindle of a roller 36 mounted in the recess 34 and movable vertically therein, the roller being cam-operated to lift the plunger for disengagement of contact element 29 from contacts 27 and 28 against the action of spring 33, which spring effects engagement of said contacts when the cam-operating means permits thereof.

The switches 19, 20 and 21 are shown as having ordinary cams 40, 41 and 42, respectively, which have high parts to lift their respective rollers, thereby to open said switches and cut away portions which permit said switches to close progressively as shaft 25 is rotated unidirectionally, said cams opening said switches in inverse order upon reverse rotation of said shaft. As will be understood from the earlier description of operation, the cam 40 is of design for opening of switch 19 only in the "off" position of handle 26, whereas cam 41 is of design for opening of switch 20 in all except positions 2 and 3, and cam 42 is of design for opening of switch 21 in all except position 3.

Preferably the switch unit is provided with suitable means such as starwheel 43 and roller 44 to insure against the shaft 25 remaining in undesirable rotary positions should the handle 26 be released in positions intermediate "off" and 1, or intermediate 1 and 2, or 2 and 3. It is desired to insure against the controller being left in intermediate "off" and position 1 to insure against switch 18 being kept closed to defeat the low voltage protection desired as soon as switch 15 responds.

The cam operating means for switch 18 comprises two cams 46 and 47 to coact with roller 36 and having limited rotary relative play, the cam 46 being fixed to shaft 25 and cam 47 being free to rotate on said shaft. As shown in Fig. 3, cam 46 has a polygonal central opening to fit and interlock with a correspondingly shaped shaft, while cam 47 has a circular central opening to fit a circular bearing element 48 carried by shaft 25, as depicted in Fig. 4. Relative play of the two cams is limited by a pin 50 on cam 47 which projects into a closed slot 51 of suitable length provided in cam 46. Both cams are in the main circular and of like diameter, such that they may individually or jointly hold the switch 18 in open position. Cam 46 has a peripheral notch 52 of such depth that when the roller drops into it the switch 18 closes, said notch being of such shape as to enable cam 46 to readily lift the roller to open switch 18. Cam 47 (see Fig. 5) has a peripheral notch 54 also of a depth such that when the roller 36 drops into it the switch 18 closes, the notch 55 being adjacent a peripheral projection 56 on cam 47.

In this instance the notches in the two cams 46 and 47 register to receive the roller 36 for closing of switch 18 when the pin 50 of cam 47 is at the upper extremity in the slot 51 of cam 46, and as will be understood from the previous description of operation such registry of the notches is to be controlled to occur in the I position of the handle when the handle is being moved from "off" position to position 1, but not upon reverse movement of the handle. The manner of obtaining this result will be clear from the Figs. 6, 7, 8 and 3 considered in the order named. Referring to Fig. 6, which shows the relation of the cams 46 and 47 in "off" position, the notch 54 of cam 47 is beneath the roller 36 but dropping of the roller is blocked by the cam 46 which now has its notch 52 out of line with the roller, the pin 50 of cam 47 now being at the lower extremity of the slot 51 in cam 46. Thus if now shaft 25 be rotated in the clockwise direction indicated by the arrow of Fig. 7 it will be observed that cam 46 will be free to rotate independently of the cam 47 to bring the notch 52 of cam 46 under the roller 36, while cam 47 is limited in frictional movement by engagement of its peripheral point 55 with roller 36. Then when the notches of both cams are under the roller 36 said roller drops, as depicted in Fig. 7 which is representative of position I, to permit closing of switch 18, and as previously explained the switch 19 also closes in this position I. At this time it will be noted that the pin 50 of cam 47 is again at the upper extremity of slot 51 of cam 46. Thus continued rotation of the shaft in the direction of the arrow of Fig. 7 will cause cams 46 and 47 to move together into position 1 depicted in Fig. 8 to lift roller 36 to open switch 18 and to shift the projection 55 of cam 47 to the opposite side of the axis of roller 36. Thereafter continued rotation of the shaft 25 to effect closure of switches 20 and 21 will cause cams 46 and 47 to move together in the same relation as that shown in Fig. 8. Consequently when the shaft is rotated in a reverse direction to restore the controller to "off" position the cam 46 will be free to move independently of the cam 47 to put the notch of the cam 46 in the lead, causing the cam 47 to block dropping of the roller 36 of switch 18 as the notch 52 passes said roller in going through position I, depicted in Fig. 3, to "off" position, depicted in Fig. 6. Meanwhile the notch 54 of cam 47 is brought beneath the roller 36, but the roller is blocked from dropping by the cam 46, it requiring as previously set forth subsequent rotation of the shaft 25 from "off" position to intermediate position to effect reclosure of switch 18.

Thus despite the seemingly involved camming mechanism for the switch 18 it will be apparent that as aforementioned no complication is introduced into the manual control, and as will be apparent the control illustrated has not only the advantage of eliminating need of a special low voltage relay but has the additional advantage of avoiding supply of energy for coil energization while the controller is in "off" position.

Referring to the modified controller shown in Fig. 9, the motor M has armature resistances $R^1$ and $R^2$ as in Fig. 1, but in this instance the resistances $R^1$ and $R^2$ are controlled directly by cam operated switches 60 and 61 similar to the switches 20 and 21 of Fig. 3. In this instance the only electroresponsive switch is switch 62 which is like the main switch 15 of Fig. 1 and which has a mechanical control switch 63 like the control switch 18 of Figs. 1 and 3. However, the switch 62 does not alone complete the motor circuit, there being additional mechanically operated switches 64 and 65 in the motor circuit.

In this form of control it is desired as shown in the chart, Fig. 10, to have all of the switches open in the "off" position of the mechanical controller later to be described. It is desired as shown by the chart to have switch 63 close momentarily in the I position of the controller as it is moved from "off" to position 1, thereby to connect the winding c of switch 62 directly across lines $L^1$ and $L^2$ as in Fig. 1. As will be understood, the arrow tipped lines of chart Fig. 10 indicate the positions in which their respective switches are closed, assuming movement of the controller in a direction corresponding to the arrow. Also it is desired to have switch 64 close in position I and to be closed in positions 1, 2 and 4, but open in position 3, all as indicated by lines with downwardly pointed arrows. Closure of switch 64 following response of switch 62 completes for the latter a maintaining circuit paralleling switch 63. This maintaining circuit may be traced from line $L^1$ through the now closed contacts b of switch 62 to the bridging element of switch 64 and through the left hand side of said switch to and through resistance r to a point between switch 63 and the winding c of switch 62. When switch 64 is opened in passing out of position 2 toward position 3 said maintaining circuit of switch 62 is preserved by the then closed switch 60 which as shown by the chart lines closes in position 2 and thereafter remains closed pending return to position 1. Thus in all operating positions switch 62 is energized subject to deenergization by failure of voltage and subject to deenergization at will by opening of switch 64 through return to "off" position, whereas automatic reclosure of switch 62 when released through drop in voltage is prevented by the open condition of switch 63 and the inclusion of resistance r in the maintaining circuit. Switch 63, as indicated by the chart, does not reclose upon return to "off" position but like switch 18 of Figs. 1 to 8 recloses only after return to I position via "off" position, wherefore the low voltage protection and reset features closely simulate those of the controller of Figs. 1 to 8.

When switches 62 and 64 are thus closed the motor is connected to line $L^1$, but not to line $L^2$. However, as indicated by the chart, Fig. 10, switch 65 closes in position 1 and remains closed pending return to "off" position, this switch when closed connecting the motor to line $L^2$ for completion of the motor circuit. While switch 65 thus must take the arcing, if any, incident to establishing the motor circuit its opening which is delayed until after opening of switch 64 compels the electro-magnetic switch 62, which is preferably of a quick release type, to take the arcing incident to breaking the motor circuit. Here it is to be noted that although the switch 64 is in series with the motor and is used to deenergize switch 62 it has been found that with the connections shown switch 64 will so function prior to opening thereof to a sufficient extent to interrupt the motor circuit. Thus with the switch 62 designed for quick release the switch 64 as well as the switch 65 will be protected against the arcing incident to interruption of the motor circuit. As will be seen, the connections of the switch 64 place the high resistance maintaining circuit of the switch 62 under the control of the left hand set of contacts of said switch while placing the motor circuit under the control of the right hand set of contacts of said switch, making it possible for the switch 64 to function as described.

When the switches 62, 64 and 65 are closed with the switches 60 and 61 open the motor circuit includes both resistors $R^1$ and $R^2$ in a series relation. However, when the controller is moved to position 2 the switch 60 closes as indicated by chart, Fig. 10, remaining closed pending return to position 1, and said switch when closed short-circuits resistance R¹, as will be apparent from Fig. 9. In short-circuiting resistance R¹ switch 60 also short-circuits switch 64, which switch is opened in position 3. Thus when switch 61 closes in position 3, as indicated by the chart, the resistors R¹ and R² are placed in a parallel relation in the motor circuit by switches 60 and 61, as will be apparent from Fig. 9. Then when switch 64 is reclosed in position 4 it together with switch 61 short-circuits both resistors R¹ and R², leaving the motor connected directly across lines L¹ and L².

Referring now to the modified mechanical controller for this species of control, the same is shown schematically in Fig. 11. The switch 63, inclusive of its dual cam operating means, is identical with switch 18 of the controller of Fig. 3 except that in Fig. 11 it is shown in "off" position. The switches 60, 61 and 64 respectively have single operating cams 70, 71 and 72 of the same general type as cams 40, 41 and 42 of Fig. 3. However, the cam 72 has spaced high points for affording the repeated operations of the switch 64 heretofore set forth. The switch 65, on the other hand, has a dual cam of the same general type as that of switch 63 and comprising parts 74 and 75. The part 74 has a closed slot 76 to receive a pin 77 carried by the part 75, said part 75 also having a point 78 to cooperate with the roller 36 engaged by both cam parts. The cam parts 74 and 75 have high and low roller engaging parts, the low parts corresponding to the notches of the dual cam of Fig. 3 but being of much greater extent peripherally of the cam parts. All cams except one cam part of each of switches 63 and 65 are fixed to a common shaft 79, the other cam part of each of switches 63 and 65 being loose on said shaft, which shaft may be handle operated as in the case of the shaft 25 of Fig. 3.

Referring to Fig. 12, the same shows the relation of the cam parts of each of the switches 63 and 65 in the I position of the shaft 79 attained by rotation of said shaft in the direction of the arrow. The cam parts of the switch 63 are in the same relation as that depicted in Fig. 7 for switch 18, and hence further explanation is unnecessary, it being noted that in this position of the shaft the roller 36 of switch 63 has dropped to permit closure of said switch. On the other hand, it will be noted that the roller of switch 65 is retained in raised position by the cam part 75 although the cam part 74 has its high peripheral portion removed from blocking relation with roller 36. Thus in this I position of the shaft 79 the switch 63 will be closed while the switch 65 will be held open in accordance with chart Fig. 10, it being noted that in this position the pin and slot connections of the two sets of cam parts is such that upon continued rotation of the shaft in the direction of the arrow, there will be no relative motion of the cam parts of switch 63, whereas cam part 74 of switch 65 will move the cam part 75 with it.

Now assuming such continued rotation of the shaft 79 to position 1, it will be observed that a slight rotation of the shaft will move the point 78 of cam part 75 of switch 65 past the vertical center line through its roller 36 whereupon the roller 36 will be free to drop to permit switch 65 to close. Here it is to be noted that as soon as the cam point 78 passes the vertical center line through the roller 36, the roller exerts a camming action on the cam part 75 which is now free to move without restraint by the cam part 74 because of the position of the pin 77 in the slot 76. Prior to the quick closure of switch 65 the switch 63 is opened by its cam in the manner previously explained. When the rotation of the shaft to postion 1 has been completed the cam parts of the switches 63 and 65 will be in the relation depicted in Fig. 13. Here it will be noted that the pins of the two sets of cam parts occupy like positions in their respective slots, providing in each case for movement of the cam parts together as rotation of the shaft is continued in the direction of the arrow to operate the cams 70, 71 and 72 for operation of switches 60, 61 and 64 in the manner aforedescribed.

When the shaft 79 has been moved to position 1 or therebeyond and then returned to I position the play of the cam parts of switches 63 and 65 is taken up without affecting either of said switches, and as previously explained in connection with switch 18 of Figs. 1 to 8 this takeup of play in the case of switch 63 provides for return to "off" position without permitting switch 63 to reclose. However, in the case of switch 65 when the play of its cam parts has been taken up said cam parts have their high point sections brought into register and into close proximity to the roller of switch 65 in the I position of the shaft 79, as depicted in Fig. 14, preparatory to lifting said roller and opening said switch as shown in Fig. 11 as the shaft moves to "off" position.

What I claim as new and desire to secure by Letters Patent is:

1. In a circuit controller, in combination, a plurality of switches, a common control element therefor, operating connections between certain of said switches and said element providing for reverse operations of the former by reverse movements of the latter, operating connections between said element and another of said switches providing for its closure momentarily only as said element is moved from "off" position to operate other of said switches, and further providing for rendering said momentarily closed switch free from influence by return movement of said element to "off" position, and an electroresponsive main switch for the controlled circuit dependent for initial energization upon closure of said switch which is closed momentarily only.

2. In a circuit controller, in combination, a plurality of switches, a common control element therefor, operating connections between certain of said switches and said element providing for reverse operations of the former by reverse movements of the latter, operating connections between said element and another of said switches and providing for its closure momentarily only as said element is moved from "off" position to operate other of said switches, and further providing for rendering said momentarily closed switch free from influence by return movement of said element to "off" position, and an electroresponsive main switch for the controlled circuit dependent for initial energization upon closure of said switch which is closed momentarily only, said electroresponsive switch having a maintaining circuit including certain of its own contacts.

3. In a circuit controller, in combination, a plurality of switches, a common control element therefor, operating connections between certain of said switches and said element providing for reverse operations of the former by reverse movements of the latter, operating connections between said element and another of said switches and providing for its closure momentarily only as said element is moved from "off" position to operate other of said switches, and further providing for rendering said momentarily closed switch free from influence by return movement of said element to "off" position, and an electroresponsive main switch for the controlled circuit dependent for initial energization upon closure of said switch which is closed momentarily only, said electroresponsive switch having a maintaining circuit including certain of said switches operable by said element thereby enabling deenergization of said electroresponsive switch at will under the control of said element.

4. In a circuit controller, in combination, a plurality of switches, a common control element therefor, operating connections between certain of said switches and said element providing for reverse operations of the former by reverse movements of the latter, operating connections between said elements and another of said switches and providing for its closure momentarily only as said element is moved from "off" position to operate other of said switches and further providing for rendering said momentarily closed switch free from influence by return movement of said element to "off" position, and an electroresponsive main switch for the controlled circuit dependent for initial energization upon closure of said switch which is closed momentarily only, said electroresponsive switch having a maintaining circuit including certain of its own contacts, and additionally including certain of said switches operable by said element, whereby said maintaining circuit is subject to interruption automatically by deenergization of said electroresponsive switch or at will under the control of said element.

5. In a circuit controller, in combination, a plurality of switches, a common control element therefor, operating connections between said switches and said element comprising means to effect reverse operations of certain of said switches by reverse movements of said element and comprising camming means individualized to another of said switches and providing for its closure momentarily only as said element is moved from "off" position to operate other of said switches, and further providing for rendering said momentarily closed switch free from influence by return movement of said element to "off" position, and an electroresponsive main switch for the controlled circuit, which for response to close is dependent upon closure of said switch which is closed momentarily only.

6. In a circuit controller, in combination, a switch, a rotatable control element therefor rotatable in opposite directions and operating connections between said element and said switch comprising a two-part cam having a lost motion connection between its two cam parts, said two-part cam upon continuous rotation of said element in one direction away from a given angular position providing camming action to effect closing and subsequent opening of said switch, and upon reverse rotation of said element to said given angular position providing modified camming action to maintain said switch open.

7. In a circuit controller, in combination, a plurality of switches, a rotatable control element therefor rotatable in opposite directions and operating connections between said element and said switches comprising for one of said switches a multi-part cam having lost motion connection of the parts thereof, said multi-part cam upon continuous unidirectional rotation of said element away from a given angular position effecting a closing and opening cycle of said one switch and then freeing it from the influence of said element throughout continued rotation of the latter in the same direction for operation of other of said switches and also throughout reverse rotation of said element to said angular position.

8. In a circuit controller, in combination, a switch, a control element movable in reverse directions, and operating connections between said element and said switch comprising a two-part cam having a lost motion between the parts thereof, said two-part cam upon movement of said element in one direction to a given point effecting closing of said switch and continued closure thereof pending reverse movement of said element to and substantially beyond said point and then by such reverse movement effecting opening of said switch.

9. In a circuit controller, in combination, a switch, a control element movable in reverse directions, and operating connections between said element and said switch comprising a two-part cam having a lost motion between the parts thereof, said two-part cam upon movement of said element in one direction to a given point effecting closing of said switch and continued closure thereof pending reverse movement of said element past the aforementioned point of closing of said switch to a second point determined by the extent of lost motion between said cam parts and thereupon effecting opening of said switch.

10. In a circuit controller, in combination, a plurality of switches, a control element therefor movable in opposite directions, and operating connections between said element and said switches, the operating connections for one of said switches providing upon continuous unidirectional movement of said element away from a given position, closing and subsequent opening of said one switch and rendering said one switch free from influence by reverse movement of said element to said position, the operating connections for a second of said switches providing for closure thereof by said unidirectional movement of said element prior to opening of said one switch, and the operating connections for a third of said switches providing for closure thereof upon said unidirectional movement of said element and after closure of said second switch, said operating connections for said second and third switches providing for opening of both by reverse movement of said element and further providing for opening of said second switch after a circuit interruption by said second switch.

11. In a circuit controller, in combination, a plurality of switches, a rotatable control element therefor rotatable in opposite directions, cam type operating connections between said element and said switches, the operating connections for a first of said switches comprising a two-part cam having lost motion connection of its parts and providing a closing and opening cycle of said first switch upon continuous unidirectional rotation of said element away from a given position and for inaction of said first switch upon reverse rotation to said given position, the operating connections for a second of said switches providing for closure thereof by said unidirectional rotation of said element prior to re-opening of said first switch, and further providing for re-opening of said second switch by reverse rotation of said element, and the operating connections of a third, of said switches comprising a two-part cam with lost motion connection of its parts providing for closing of said third switch after closure of said second switch and by said unidirectional rotation of said element, and further providing by said reverse rotation of said element reopening of said third switch but only after take-up of lost motion in its operating connections for delayed action in response to said reverse rotation of said element.

12. In a circuit controller, in combination, an electroresponsive switch having energizing connections and maintaining connections, two switches respectively controlling said connections, an additional switch serving jointly with said electroresponsive switch to control a circuit, a common control element for the last mentioned three switches movable in opposite directions, and individual operating connections between said element and said three switches effecting by unidirectional movement of said element closing of said two switches sequentially to complete sequentially the energizing and maintaining connections of said electroresponsive switch, then re-opening of the switch first closed and closing of said additional switch, said operating connections rendering said re-opened switch free from influence by reverse movement of said element and subjecting both of said closed switches to opening operation by said reverse movement of said element but delaying re-opening of said switch serving jointly with said electroresponsive switch, until after de-energization of said electroresponsive switch.

13. In a circuit controller, in combination, an electroresponsive switch and a manual control device including a switch to control jointly with said electroresponsive switch the continuity of a circuit, and further including contacts for energizing and deenergizing said electroresponsive switch at will, said control device having a common operating element for its said switch and contacts and sets of operating connections between said element and its said associated switch and contacts to afford said device the characteristic of providing for closing of said electroresponsive switch alone and then closing of said switch of said control device and the further characteristic of delaying re-opening of the last mentioned switch until after said electroresponsive switch is deenergized.

14. In a circuit controller, in combination, a switch biased to a first position and movable against its bias to a second position, a control element for said switch and operative connections affording movement of said switch by said element between said switch and said control element to its said second position, said operative connections comprising means to lock said switch in its said second position subject to release by movement of said element in one direction from a given position, said element upon continued movement in the same direction effecting return of said switch from its said first position to its said second position, and said means then locking said switch in its said second position throughout continued movement of said element in the same direction and throughout its return movement to said given position.

15. In a circuit controller, in combination, a switch biased to a first position and movable against its bias to a second position, a control element for said switch and operative connections between said switch and said control element affording movement of said switch to its said second position by movement of said element through a relatively small range, said operating connections comprising means to lock said switch in its said second position for free movements of said element, said means so locking said switch throughout movement of said element in one direction between given positions, and unlocking said switch for biased movement thereof to its said first position when said element is moved in an opposite direction to a given position, and said means being responsive to subsequent switch actuating movement of said element to re-lock said switch in its said second position throughout continued movement of said element in the same direction.

16. In a circuit controller, in combination, a plurality of switches, a common control element therefor, operating connections between said switches and said element to provide for different operations of said switches by reverse movements of said element, an addditional switch, other operating connections between said element and said additional switch comprising a dual cam having a lost motion connection between camming parts thereof, said dual cam providing for closing said additional switch momentarily only, as said element is moved from off position for operation of the first mentioned switches and said dual cam rendering said additional switch free from influence by movement of said element to off position, and an electroresponsive main switch for the controlled circuit, which for response to close is dependent upon the momentary closure of said additional switch.

RICHARD B. HUNTER

Certificate of Correction

April 9, 1946.

Patent No. 2,398,007.

RICHARD B. HUNTER

It is hereby certified that error appears in the printed specification of the above numbered patent requiring correction as follows: Page 6, second column, line 1, strike out the words "between said switch and said control element" and insert the same after "connection" in line 53, first column, same page 6; and that the said Letters Patent should be read with this correction therein that the same may conform to the record of the case in the Patent Office.

Signed and sealed this 18th day of June, A. D. 1946.

[SEAL]

LESLIE FRAZER,
*First Assistant Commissioner of Patents.*